M. LOEB.
APPARATUS FOR RECOVERING FAT.
APPLICATION FILED DEC. 27, 1915.
1,237,068.
Patented Aug. 14, 1917.
2 SHEETS—SHEET 1.
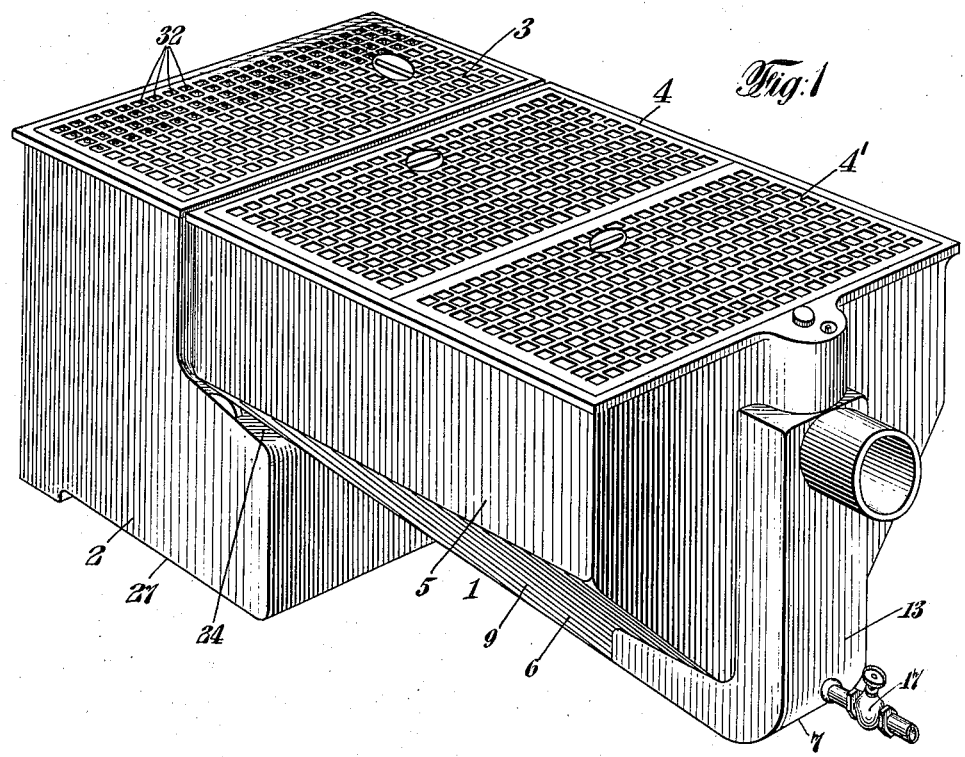
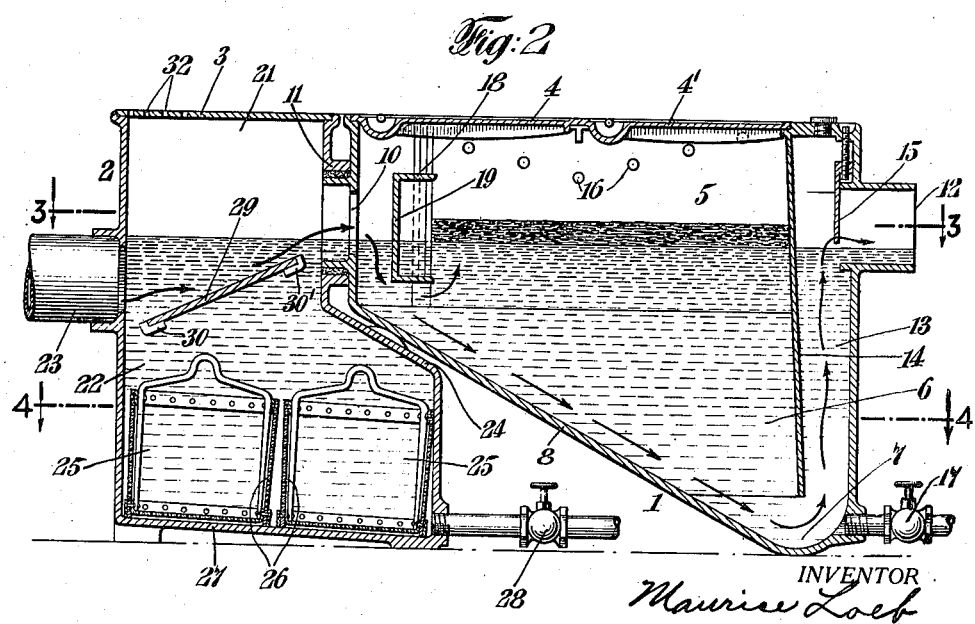
INVENTOR
Maurice Loeb,
BY
S. Mortimer Hard, Jr,
his ATTORNEYS M. LOEB.
APPARATUS FOR RECOVERING FAT.
APPLICATION FILED DEC. 27, 1915.
1,237,068.
Patented Aug. 14, 1917.
2 SHEETS—SHEET 2.
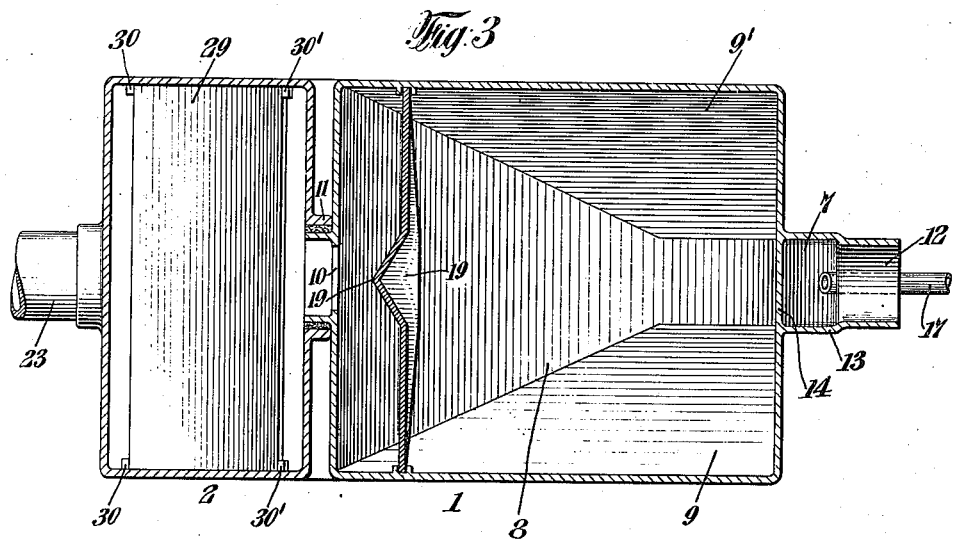
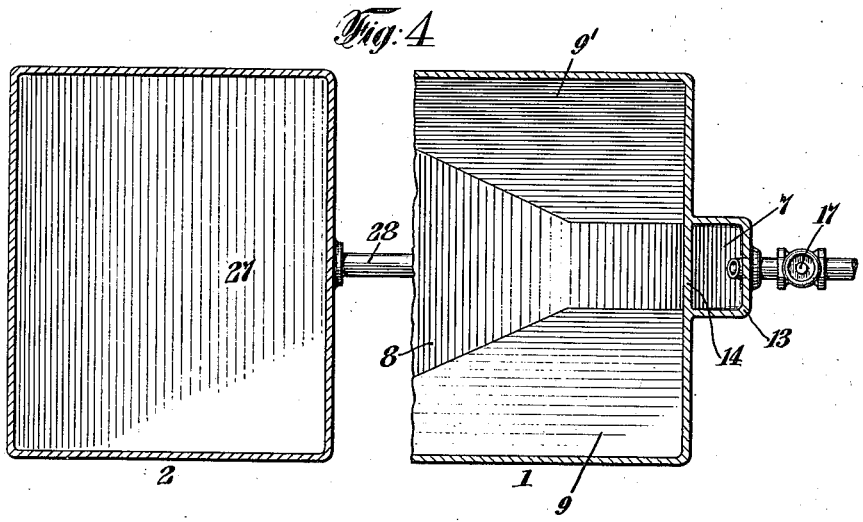
INVENTOR
Maurice Loeb,
BY
S. Mortimer Ward Jr.,
his ATTORNEYS

UNITED STATES PATENT OFFICE.

MAURICE LOEB, OF NEW YORK, N. Y., ASSIGNOR TO NATIONAL SANITARY SERVICE COMPANY, OF CHICAGO, ILLINOIS, A CORPORATION OF ILLINOIS.

APPARATUS FOR RECOVERING FAT.

1,237,068.        Specification of Letters Patent.     Patented Aug. 14, 1917.

Application filed December 27, 1915. Serial No. 68,951.

*To all whom it may concern:*

Be it known that I, MAURICE LOEB, a citizen of the United States, and a resident of the borough of Manhattan, in the county and State of New York, have invented certain new and useful Improvements in Apparatus for Recovering Fat, of which the following is a specification.

My invention relates to apparatus for recovering fat, and more particularly to apparatus for recovering fat from the refuse liquid from slaughter-houses or from other refuse liquid containing fat.

One of the objects of the invention is to provide a durable, compact and efficient apparatus of the character mentioned.

Another object of the invention is to provide apparatus of this character in which the fat may be separated from the liquid and recovered without permitting it to ferment or become rancid.

In fat-containing waste liquids there is a certain amount of sediment which, if allowed to remain in a tank or receptacle in which the fat is being collected, causes fermentation, which increases the amount of fatty acid in the fat; and furthermore, it is understood that if the fat is permitted to remain in stale water for any length of time, it becomes rancid.

In the preferred embodiment of my invention I greatly reduce the percentage of acid in the fat and keep the fat fresh by so arranging and constructing the apparatus that a relatively large volume of the fat-containing liquid is allowed to accumulate in the upper part of the tank or receptacle from which the fat is being separated, and the sediment or solid matter is caused to be separated or precipitated from the fat-containing liquid while a current of liquid, relatively heavy, from which the fat has been separated, is allowed to flow from beneath the upper relatively quiescent fat-containing body of liquid so as to carry off any sediment that may have collected in the bottom of the tank, and at the same time to keep up a continual undercurrent to prevent the liquid from becoming stale or rancid.

My invention consists in the novel features and combinations of features hereinafter shown and described in their preferred embodiment, and more particularly pointed out in the appended claims.

Further objects and advantages of the invention will more fully appear from the following description taken in connection with the accompanying drawings showing the preferred form of the invention, and in which—

Figure 1 is a perspective view of the apparatus;

Fig. 2 is a longitudinal sectional elevation of the same;

Fig. 3 is a longitudinal section taken on line 3—3 of Fig. 2; and

Fig. 4 is a longitudinal section taken on line 4—4.

Referring to the drawings, Figs. 1 and 2, 1 is the fat-recovery tank shown in its preferred embodiment, and 2 is the sediment-collecting tank, preferably used in connection with the fat-recovery tank, to separate most if not all of the sediment before the fatty liquid reaches tank 1. These tanks are preferably arranged to be located beneath the floor so that their tops are flush with the floor, their covers 3 and 4, 4' constituting gratings in the floor. The tanks may be located in a suitable pit or room below the floor so as to permit access around the same.

The tank 1 consists of an upper portion 5 of relatively large horizontal sectional area, and of a lower portion 6 which is narrower than the upper portion and gradually decreases in width toward the extreme bottom of the tank which terminates in an apex at 7. The object of the construction shown is to provide an upper portion of relatively large capacity as compared with the lower portion, for the purpose of holding a relatively large volume of fat-containing liquid substantially quiescent, notwithstanding the continual flow of liquid through the tank; and to this end, the sides of the upper portion of the tank are made substantially vertical so that the shape of this upper portion is rectangular and having a substantial depth. The desired function of the lower part of the tank is to cause a continuous current of liquid to flow beneath the upper quiescent fat-retaining stratum, and preferably to have the current flowing relatively slowly in the entrance end of the tank and gradually accelerating as it passes through the tank along the bottom thereof to the exit end so as to take out any foul liquid at the bottom containing any sediment or solid matter that may not have been collected in the sediment tank, or which will be in the liquid in large quantity if the sediment tank is not used. It is also desirable that the total capacity of the tank shall progressively increase from the inlet toward the outlet, whereby to provide a larger volume of relatively quiescent liquid above the underlying current, the said quiescent body of liquid deepening toward the outlet and also widening upwardly so that the upward movement of the fat therein shall gradually become slower as the cross section increases. To this end, the tank is constructed much deeper at the exit end than at the entrance end, and the bottom of the tank is very narrow at the exit end and widens out as it extends upwardly toward the shallower entrance end. In the form of the invention shown, this is accomplished by providing bottom wall 8, as shown in Fig. 3, extending upwardly from the bottom of the exit end to the entrance end and flaring outwardly, and by providing side walls 9, 9' diverging upwardly from the bottom wall of the tank to the side walls of the upper portion of the tank. This construction provides a narrow channel on the bottom of the tank to cause a substantial current of the liquid to flow therethrough.

The upper portion of the tank 1 at its entrance end, is provided with an inlet opening 10 communicating with an outlet opening 11 in the sediment tank, when one is used; and at its opposite end, this upper portion is provided with an outlet 12 which, in the form shown, is on a level with the inlet 10. The tank 1 is also provided with a suitable discharge passage extending from the lower portion of the tank upwardly to the outlet opening, and in the present form of the invention, this discharge opening is formed integrally with the tank in a projection 13, with a partition 14 dividing the same from the rest of the tank, except for the communication at the bottom. This exit passage is provided with a suitable hand-operated gate valve 15, the function of which is to close the outlet at any time so as to cause an increased height of liquid within the tank 1, and hence cause any fat that may collect on top of the same to automatically flow out of the tank, preferably through openings 16 arranged in a V outline, or in any other suitable outline, so that the capacity of these outlets is gradually increased with an increased supply of the fat. The discharge passage is of relatively small cross-sectional area so as to form a continuation of the contracted channel at the bottom portion of the tank, but this passage slightly increases in cross-sectional area from the bottom upwardly so as to increase the siphon action on the liquid. This may be accomplished in the form of the invention shown, by slightly inclining the partition 14 or otherwise contracting any wall or walls of the discharge passage into whatever form they may be constructed.

The tank 1 is also provided with a drain pipe and valve 17 to clean out the bottom of the same in case of any trouble, and with a baffle plate 18 arranged across the upper portion of the tank in front of the inlet opening 10, this baffle plate having a projection 19 preferably V-shaped in horizontal section. The baffle plate extends below the inlet opening, and, as constructed, performs the double function of spreading the incoming current of liquid laterally and causing it to flow downwardly so as not to unduly disturb the quiescent stratum of fat-containing liquid in the upper portion of the tank behind the baffle plate on which the fat is being accumulated.

In the more complete and perfect form of the invention, the sediment-collecting tank 2 is used in conjunction with the fat-recovery tank, and in its preferred form, it consists of two portions, an upper portion 21 and a lower portion 22. The upper portion 21 has at one end the afore-mentioned outlet opening 11 fitting the opening 10 to the fat-recovery tank, and at its opposite end an inlet opening 23 located somewhat below the line of the outlet opening, for the purpose hereinafter described. The length of the upper portion between said openings 11 and 23 is preferably relatively short, while the length of the lower portion 22 is made longer to give the lower portion greater capacity, and the extended end of the lower portion forms a ledge or shelf 24 for supporting the adjacent bottom wall of the fat-recovery tank. The lower portion of the tank 2 is the portion in which the sediment is collected, and for the purpose of readily removing the same, I provide one or more troughs 25 into which the sediment or solid matter is precipitated, and these may be lifted out of the top of the tank by suitable means; and to enable them to be lifted without suction or interference one with the other, their side walls 26 are tapered downwardly and inwardly. The bottom wall of the sediment tank 27 is inclined toward a drain pipe and valve 28.

In order to precipitate the sediment from the fat-containing liquid within the tank 2 and cause the fat-containing liquid to flow into the fat-recovery tank after the sediment or solid matter has been precipitated, I provide a baffle or deflector plate 29 within the upper portion of the sediment tank arranged across the same intermediate the inlet and outlet openings and inclined from the bottom of the inlet opening upwardly to the bottom of the outlet opening, so that as the liquid is discharged against this plate, it strikes the same, causing the sediment or solid matter to be precipitated into the lower portion of the tank while the liquid thus freed of the sediment is deflected by the inclined surface of the plate through the opening into the tank 1. This plate is supported on lugs 30, 30' from which it may be lifted in order to lift the troughs 25. The tank is also provided with a detachable cover 3 having drain openings 32 on its forward end through which the washings of the floor or other liquid containing fat may be swept or flushed, these openings being in alinement with the front end of the deflector plate to allow the liquid to enter the sediment tank at a point where the solid matter therein can settle in the tank 2 while the fat is deflected into the fat-recovery tank.

The operation of the preferred form of the apparatus just described is as follows:

As the liquid is discharged from the inlet pipe 23 into the tank 2, it strikes the baffle plate, causing the heavy sediment or solid matter, or a large portion of the same, to be precipitated into the relatively quiescent volume of water in the lower part of the tank 2, from which it settles into the buckets or troughs 25, the fat-containing liquid at the same time being deflected and caused to flow through the opening between the tanks into the fat-recovery tank, where it strikes the V-shaped projection of the baffle plate 18, causing the liquid to be spread laterally and at the same time deflected downwardly. As the liquid passes below the baffle plate flowing slowly, the fat rises into the relatively quiescent body behind the baffle plate, while the heavier liquid within the tank 1 is caused to flow with acceleration down the narrowing bottom portion of the tank and up through the discharge passage and outlet. The current at the apex of the tank 1 is sufficient to take out sediment that may collect at that point.

It will thus be seen that the apparatus may be kept in continual operation until it is desired to remove the sediment from the troughs, and that the liquid in the upper portion of the fat-recovery tank is maintained substantially quiescent for the separation of the fat therefrom; and that the fat which gathers on top of this liquid is kept free of the sediment which would cause fermentation, and is kept from becoming rancid by reason of the fact that as the fat is separated from the liquid, such liquid is carried off in the current flowing through the bottom of the tank. The apparatus is not only compact and durable, but has proven highly efficient, both in the percentage of fat recovery from fat-containing liquid and in the freshness of the same and the small percentage of fatty acids therein.

While I have described the preferred form of my invention, it will be obvious to those skilled in the art, after understanding my disclosure, that modifications and changes may be made in the apparatus without departing from the spirit or scope of the invention, and I do not wish to be understood as limiting myself other than as indicated in the appended claims.

Having thus described my invention, what I claim as new and desire to secure by Letters Patent, is:

1. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-containing liquid of substantial depth to permit the collection of fat on the surface thereof, the lower portion of the tank diminishing in horizontal section toward the bottom as it extends downward from the upper portion to form at the bottom a channel of small cross-sectional area along which a current of liquid is caused to flow, said tank having an inlet in its upper portion at one end through which inlet the liquid is admitted to the tank, and a discharge passage of relatively small cross-sectional area at the other end of the tank extending upwardly from the lower portion to a discharge opening at the upper portion, whereby, as the liquid is discharged into the tank, a large volume of the lighter fat-containing liquid remains quiescent in the upper part of the tank for the separation of fat while the heavier liquid from which the fat has been separated, is caused to flow in a current along the lower portion and then upwardly therefrom to the outlet.

2. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-containing liquid of substantial depth to permit the collection of fat on the surface thereof, the lower portion of the tank diminishing in horizontal section toward the bottom as it extends downward from the upper portion to form at the bottom a channel of small cross-sectional area along which a current of liquid is caused to flow, said tank having an inlet in its upper portion at one end through which inlet the liquid is admitted to the tank, a baffle plate in the upper part of the tank against which the inflowing liquid is discharged so as to divert the current of liquid from being discharged directly into the fat-collecting upper portion of the tank, so as to maintain the liquid in such portion quiescent, and a discharge passage of relatively small cross-sectional area extending upward from the bottom of the exit end of the tank up to a discharge opening at the upper portion so as to constitute a continuation of the bottom channel of small cross-sectional area, whereby, as the liquid is discharged into the tank, a large volume of the lighter fat-containing liquid remains quiescent in the upper part of the tank for the separation of fat while the heavier liquid from which the fat has been separated, is caused to flow in a current along the lower portion and then upwardly therefrom to the outlet.

3. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-containing liquid of substantial depth to permit the collection of fat on the surface thereof, the lower portion of the tank diminishing in horizontal section toward the bottom as it extends downward from the upper portion to form at the bottom a channel of small cross-sectional area along which a current of liquid is caused to flow, said tank having an inlet in its upper portion at one end through which inlet the liquid is admitted to the tank, a baffle plate in the upper part of the tank in front of the inlet opening having a projection extending therefrom in alinement with the inlet opening for spreading the current out laterally as it is discharged against the projection whereby the current of liquid is spread laterally and prevented from flowing directly into the fat-collecting upper portion of the tank, so as to maintain the liquid in such portion quiescent, and a discharge passage of relatively small cross-sectional area extending upwardly from the exit end of the lower portion of the tank to a discharge opening located substantially on a level with the inlet opening, whereby, as the liquid is discharged into the tank, a large volume of the lighter fat-containing liquid remains quiescent in the upper part of the tank for the separation of fat while the heavier liquid from which the fat has been separated, is caused to flow in a current along the lower portion and then upwardly therefrom to the outlet.

4. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-contining liquid of substantial depth to permit the collection of fat on the surface thereof, the lower portion of the tank diminishing in horizontal section toward the bottom as it extends downward from the upper portion to form at the bottom a channel of small cross-sectional area along which a current of liquid is caused to flow, said tank having an inlet in its upper portion at one end through which inlet the liquid is admitted to the tank, a discharge passage of relatively small cross-sectional area extending upwardly from the lower portion to a discharge opening at the upper portion, and a valve in the discharge passage having means for operating the same whereby the separated fat may be caused to rise and flow from the tank by throttling the flow of current through the discharge passage while current is flowing through the inlet passage in the tank.

5. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-containing liquid of substantial depth to permit the collection of fat on the surface thereof, one or more openings in the side of the tank arranged to outline substantially a V through which the separated fat is discharged, the lower portion of the tank diminishing in horizontal section toward the bottom as it extends downward from the upper portion to form at the bottom a channel of small cross-sectional area along which a current of liquid is caused to flow, said tank having an inlet in its upper portion at one end through which inlet the liquid is admitted to the tank, and a discharge passage of relatively small cross-sectional area extending upwardly from the lower portion to a discharge opening at the upper portion, whereby, as the liquid is discharged into the tank, a large volume of the lighter fat-containing liquid remains quiescent in the upper part of the tank for the separation of fat while the heavier liquid from which the fat has been separated, is caused to flow in a current along the lower portion and then upwardly therefrom to the outlet.

6. In apparatus for the recovery of fat, the combination of a tank into which the fat-containing liquid is conveyed, said tank having upper and lower portions, the upper portion having a relatively great horizontal sectional area continuing downward for a substantial depth to retain a relatively large volume of quiescent fat-containing liquid of substantial depth to permit the collection of fat on the surface thereof, the tank increasing in depth toward the exit end, and the lower portion of the tank diminishing in horizontal section toward the bottom as it extends downward from the upper portion to form at the bottom a channel of small cross-sectional area along which a current of liquid is caused to flow with increased velocity to the exit end, said tank having an inlet in its upper portion at one end through which inlet the liquid is admitted to the tank, a baffle plate in the upper part of the tank against which the inflowing liquid is discharged so as to divert the current of liquid from being discharged directly into the fat-collecting upper portion of the tank, to maintain the liquid in such portion quiescent, and a discharge passage of relatively small cross-sectional area extending upward from the bottom of the exit end of the tank up to a discharge opening at the upper portion so as to constitute a continuation of the bottom channel of small cross-sectional area, whereby, as the liquid is discharged into the tank, a large volume of the lighter fat-containing liquid remains quiescent in the upper part of the tank for the separation of fat while the heavier liquid from which the fat has been separated, is caused to flow in a current of increasing velocity along the lower portion and then upwardly therefrom to the outlet.

7. In apparatus for the recovery of fat, the combination of a tank into which the fat-containing liquid is conveyed, said tank having an upper portion of relatively large horizontal sectional area for accommodating a relatively large volume of fat-containing liquid in a quiescent state to permit the separation of the fat therefrom, and having a lower portion for directing a current of the liquid through the tank, an inlet at one end of the tank and an outlet at the other end, the tank being substantially deeper at the outlet end than at the inlet end, and the bottom of the exit end of the tank being substantially narrower than the top of the tank at the exit end and being substantially narrower than the bottom of the tank at the inlet end, the bottom of the tank extending upwardly and outwardly from the narrow exit end of the lower portion toward the wider inlet end, whereby the liquid is caused to flow with acceleration along the bottom portion of the tank toward the exit end, and a discharge passage of relatively small cross-sectional area leading from said deep and narrow bottom portion to the outlet so as to maintain the accelerated current flow to assist the removal of sediment from the bottom of the tank.

8. In apparatus for the recovery of fat, the combination of a tank into which the fat-containing liquid is conveyed, said tank having an upper portion of relatively large horizontal sectional area for accommodating a relatively large volume of fat-containing liquid in a quiescent state to permit the separation of the fat therefrom, said tank having an inlet opening at one end and an outlet opening at the other end, and having a lower portion with a bottom apex at the exit end from which the bottom wall of the tank extends upwardly toward the inlet end of the tank and outwardly, the side walls of the lower portion extending from the apex upwardly and outwardly to the upper portion of the tank, and a discharge passage of relatively small cross-sectional area leading from said apex upwardly to the outlet, whereby the liquid is allowed to flow slowly along the inlet end of the tank to permit the fat to rise in the body of quiescent liquid in the upper portion of the tank, and the heavy strata of liquid from which the fat has been separated to flow with increased velocity along the bottom of the tank and then through the exit passage to the outlet.

9. In apparatus for the recovery of fat, the combination of a tank into which the fat-containing liquid is conveyed, said tank having an upper portion of relatively large horizontal sectional area not substantially decreasing throughout its depth so as to hold a relatively large volume of liquid, said upper portion having an inlet at one end and an outlet at the other end, said tank having a lower portion forming substantially an apex at the exit end from which the bottom wall flares upwardly toward the inlet end and outwardly, and from which the side walls diverge upwardly to the side walls of the upper portion of the tank, and a discharge passage commencing at the apex portion and extending up to the discharge opening, whereby the liquid flows slowly at the inlet end of the upper portion, becoming subsequently quiescent for the separation of fat in the upper portion, while the heavier stratum of liquid from which the fat has been separated flows down the bottom of the lower portion with increased velocity and then up through the outlet passage.

10. In apparatus for the recovery of fat, the combination of a tank into which the fat-containing liquid is conveyed, said tank having an upper portion of relatively large horizontal sectional area not substantially decreasing throughout its depth so as to hold a relatively large volume of liquid, said upper portion having an inlet at one end and an outlet at the other end, said upper portion having a baffle plate arranged transversely of and in front of the inlet opening so as to give the current of liquid discharged through the inlet a downward flow and prevent its disturbing the separation of fat in the main volume of liquid in the upper part of the tank, said tank having a lower portion forming substantially an apex at the exit end from which the bottom wall flares upwardly toward the inlet end and outwardly, and from which the side walls diverge upwardly to the side walls of the upper portion of the tank, and a discharge passage of small cross-sectional area commencing at the apex portion and extending up to the discharge opening, whereby the liquid flows slowly at the inlet end of the upper portion, becoming subsequently quiescent for the separation of fat in the upper portion, while the heavier strata of liquid from which the fat has been separated flows down the bottom of the lower portion with increased velocity and then up through the outlet passage.

11. In apparatus of the character described, the combination of a tank for the recovery of fat from fat-containing liquid, said tank having an inlet opening and an outlet opening, a sediment-collecting tank having an outlet opening communicating with the inlet to the first tank, said sediment tank also having an inlet at its opposite end from the outlet through which inlet the fat-containing liquid is discharged into the tank, an inclined deflector plate arranged in said last tank and extending between its inlet and outlet openings but slightly spaced from the inlet opening and against the upper side of which the fat-containing liquid is discharged from the inlet to precipitate the sediment and deflect the fat-containing liquid into the fat-recovery tank.

12. In apparatus of the character described, the combination of a tank for the recovery of fat from fat-containing liquid, said tank having an inlet opening and an outlet opening, a sediment-collecting tank having an outlet opening communicating with the inlet opening to the first tank, said sediment tank also having an inlet at its opposite end from the outlet and located lower than the outlet, said tank having an inclined deflector plate arranged between but slightly spaced from said openings and against which the incoming liquid is discharged from the inlet to precipitate the sediment in the sediment-containing tank and to deflect the fat-containing liquid through the exit opening into the fat-recovery tank.

13. In apparatus of the character described, the combination of a tank for the recovery of fat from fat-containing liquid, said tank having an inlet opening and an outlet opening, a sediment-collecting tank having a relatively small portion through which fat-containing liquid is caused to flow, and having a lower portion of relatively large volume adapted to hold a large volume of relatively quiescent liquid from which the sediment is separated, said sediment tank having an outlet opening in its upper portion communicating with the inlet to the fat-recovery tank, and having an inlet opening in its opposite end from the outlet opening and located below the line of its outlet opening, and a baffle and deflector plate within the upper portion of the sediment tank between its inlet and outlet openings and inclining upwardly from the inlet opening toward the outlet opening, whereby the fat-containing liquid may be discharged against said plate to cause the sediment to be precipitated to the bottom of the sediment tank and the fat-containing liquid to be deflected into the fat-recovery tank.

14. In apparatus of the character described, the combination of a tank for the recovery of fat from fat-containing liquid, said tank having an upper part of relatively large horizontal sectional area adapted to hold a relatively large volume of quiescent fat-containing liquid and having a bottom portion of substantially less horizontal sectional area, the bottom walls of which form a narrow channel for the flow of liquid through the tank, said tank being provided with an inlet opening at one end and with an outlet opening at the other end, a discharge passage extending from the narrow bottom portion of the tank to the outlet opening, a sediment-collecting tank arranged at the inlet end of the fat-recovery tank and comprising a current-conveying sediment-separating portion and a lower sediment-retaining portion adapted to hold a relatively large volume of liquid from which the sediment is precipitated in the tank, the upper portion of said sediment tank having an outlet opening at one end communicating with the upper portion of the fat-recovery tank and having an inlet opening at its opposite end for receiving fat-containing liquid, and an inclined baffle plate located in the upper part of the sediment tank between its inlet and outlet openings against the upper surface of which the liquid is discharged to precipitate the sediment in the sediment tank and deflect the fat-containing liquid into the fat-recovery tank.

15. In apparatus of the character described, the combination of a sediment-collecting tank for separating sediment from fat-containing liquid, said tank having an upper and a lower portion, the upper portion having an inlet opening at one end and an outlet opening at its opposite end and located above the inlet opening, the lower portion being of relatively large capacity as compared with the upper portion and extending beyond one side of the upper portion, and a baffle plate arranged in the upper part of the tank between the inlet and outlet openings and inclining upwardly from the inlet to the outlet openings.

16. In apparatus of the character described, the combination of a sediment-collecting tank for separating sediment from fat-containing liquid, said tank having an upper and lower portion, the upper portion having an inlet opening at one end and an outlet opening at its opposite end and located above the inlet opening, the lower portion of the tank being of relatively large capacity as compared with the upper portion, and a deflector plate arranged in the upper portion of the tank and extending between the inlet and outlet openings at an upward inclination, said deflector slightly spaced from both the inlet and outlet.

17. In an apparatus for the recovery of fat, a tank diminishing in horizontal section toward the bottom with downwardly converging side walls, an inlet to the upper portion of said tank adjacent one end, an outlet from said tank adjacent the other end, a deflector disposed opposite the inlet to direct the incoming liquid downwardly to the bottom portion of the reduced cross-sectional area, and a partition extending from the upper portion of the tank downwardly in front of the outlet to a point near the bottom of the tank whereby to cause an accelerated current of liquid along the bottom of the tank to the outlet and to maintain a progressively deepening and upwardly widening quiescent relatively large body of liquid above said current for the collection of the fat content.

18. In an apparatus for the recovery of fat, a tank diminishing in horizontal section toward the bottom with downwardly converging side walls, an inlet to the upper portion of said tank adjacent one end, an outlet from said tank adjacent the other end, a deflector disposed opposite the inlet to direct the incoming liquid downwardly to the bottom portion of the reduced cross-sectional area, and a partition extending from the upper portion of the tank downwardly in front of the outlet to a point near the bottom of the tank whereby to cause an accelerated current of liquid along the bottom of the tank to the outlet and to maintain a progressively deepening and upwardly widening quiescent relatively large body of liquid above said current for the collection of the fat content, and an overflow from the quiescent fat collecting space of the tank, said overflow having an upwardly increasing capacity.

19. In an apparatus for the recovery of fat, a tank diminishing in horizontal section downwardly toward the bottom, an inlet to the upper portion of said tank adjacent one end, an outlet from the upper portion of said tank adjacent the other end, the tank having a bottom sloping downwardly from the inlet end of the tank toward the outlet end with side walls gradually converging to progressively reduce the cross section, a deflector disposed opposite the inlet to direct the incoming liquid downwardly to the sloping bottom, and a partition extending from the upper portion of the tank downwardly in front of the outlet to a point near the lowest portion of the sloping bottom, whereby to cause a gradually accelerated current of liquid along the bottom of the tank to the outlet and to maintain a progressively deepening and upwardly widening quiescent relatively large body of liquid above said current for the selection of the fat content.

20. In an apparatus for the recovery of fat, a tank diminishing in horizontal section downwardly toward the bottom, an inlet to the upper portion of said tank adjacent one end, an outlet from the upper portion of said tank adjacent the other end, the tank having a bottom sloping downwardly from the inlet end of the tank toward the outlet end with side walls gradually converging to progressively reduce the cross-section, a deflector disposed opposite the inlet to direct the incoming liquid downwardly to the sloping bottom, and a partition extending from the upper portion of the tank downwardly in front of the outlet to a point near the lowest portion of the sloping bottom, whereby to cause a gradually accelerated current of liquid along the bottom of the tank to the outlet and to maintain a progressively deepening and upwardly widening quiescent relatively large body of liquid above said current for the selection of the fat content, valve means to control the outlet, and an overflow from the quiescent fat collecting space of the tank between the deflector and partition, said overflow having an upwardly increasing capacity.

In testimony whereof, I have signed my name to this specification.

MAURICE LOEB.